(12) United States Patent
Anderson et al.

(10) Patent No.: US 7,370,896 B2
(45) Date of Patent: May 13, 2008

(54) ROBOTIC HAND WITH EXTENDABLE PALM

(75) Inventors: Perry Anderson, Kensington, CA (US); J. Efrain Alcorta, San Francisco, CA (US); Scott DeWinter, Oakland, CA (US); Joel Jensen, Redwood City, CA (US); J. Kenneth Salisbury, Jr., Mountain View, CA (US); Eliot Leonard Wegbreit, Palo Alto, CA (US)

(73) Assignee: Strider Labs, Inc., Palo Alto, CA (US)

( * ) Notice: Subject to any disclaimer, the term of this patent is extended or adjusted under 35 U.S.C. 154(b) by 282 days.

(21) Appl. No.: 11/019,808

(22) Filed: Dec. 20, 2004

(65) Prior Publication Data

US 2006/0012197 A1    Jan. 19, 2006

Related U.S. Application Data

(60) Provisional application No. 60/533,667, filed on Dec. 30, 2003.

(51) Int. Cl.
    *B25J 15/10*    (2006.01)
(52) U.S. Cl. ......................................... 294/106; 901/39
(58) Field of Classification Search .................... 294/2, 294/106, 111, 119.1, 103.1, 104, 86.4; 901/31, 901/39; 623/64
    See application file for complete search history.

(56) References Cited

U.S. PATENT DOCUMENTS 3,069,761 A    12/1962    Sommer
3,694,021 A    9/1972    Mullen
3,866,966 A    2/1975    Skinner, II
3,901,547 A    8/1975    Skinner, II
3,904,234 A    9/1975    Hill et al.
3,978,605 A    9/1976    Maruniak
4,273,506 A    6/1981    Thomson et al.
4,314,471 A    2/1982    Lukach
4,351,553 A    9/1982    Rovetta et al.

(Continued)

FOREIGN PATENT DOCUMENTS

EP          0 109 201          5/1984

(Continued)

OTHER PUBLICATIONS

"Laboratoire De Robotique," Located at http://wwwrobot.gmc.ulaval.ca, visited Nov. 8, 2004.

(Continued)

*Primary Examiner*—Dean J Kramer
(74) *Attorney, Agent, or Firm*—Carr & Ferrell LLP

(57) ABSTRACT

A robotic hand comprises a base having fingers and a palm. The fingers define a working volume. The hand is able to grasp objects between the fingers and the palm by varying a distance from the palm to the working volume. Varying this distance can be achieved by either moving the palm towards the working volume or by moving the working volume towards the palm. Robotic hands that move the palm comprise an actuator that extends the palm from the base towards the working volume. Robotic hands that move the working volume relative to the palm have the fingers mounted to a common finger support unit that is configured to translate relative to the base.

7 Claims, 17 Drawing Sheets

U.S. PATENT DOCUMENTS

| | | | |
|---|---|---|---|
| 4,367,891 A | | 1/1983 | Wauer et al. |
| 4,377,305 A | | 3/1983 | Horvath |
| 4,479,673 A | | 10/1984 | Inaba et al. |
| 4,484,775 A | | 11/1984 | Norkus |
| 4,566,727 A | | 1/1986 | Yuda |
| 4,600,357 A | | 7/1986 | Coules |
| 4,607,873 A | | 8/1986 | Nusbaumer et al. |
| 4,623,183 A | | 11/1986 | Aomori |
| 4,718,709 A | | 1/1988 | Myers et al. |
| 4,792,338 A | | 12/1988 | Rennerfelt |
| 4,810,019 A | | 3/1989 | Brucher |
| 4,946,380 A | | 8/1990 | Lee |
| 5,053,687 A | * | 10/1991 | Merlet .................... 318/568.2 |
| 5,080,681 A | | 1/1992 | Erb |
| 5,088,877 A | | 2/1992 | Henk |
| 5,108,140 A | | 4/1992 | Bartholet |
| 5,172,951 A | | 12/1992 | Jacobsen et al. |
| 5,201,501 A | | 4/1993 | Fassler |
| 5,280,981 A | | 1/1994 | Schulz |
| 5,378,033 A | | 1/1995 | Guo et al. |
| 5,437,490 A | | 8/1995 | Mimura et al. |
| 5,447,403 A | | 9/1995 | Engler, Jr. |
| 5,501,498 A | | 3/1996 | Ulrich |
| 5,516,174 A | | 5/1996 | Squyres |
| 5,588,688 A | | 12/1996 | Jacobsen et al. |
| 5,628,539 A | | 5/1997 | Muchalov et al. |
| 5,702,139 A | | 12/1997 | Buck |
| 5,762,390 A | | 6/1998 | Gosselin et al. |
| 5,803,886 A | | 9/1998 | Schweizer |
| 6,244,644 B1 | | 6/2001 | Lovchik et al. |
| 6,330,837 B1 | * | 12/2001 | Charles et al. ........... 74/490.06 |
| 6,505,870 B1 | | 1/2003 | Laliberte et al. |
| 6,517,132 B2 | | 2/2003 | Matsuda et al. |
| 6,669,257 B2 | | 12/2003 | Laliberte et al. |
| 2002/0060465 A1 | | 5/2002 | Laliberte et al. |
| 2003/0090115 A1 | | 5/2003 | Kim et al. |
| 2004/0217612 A1 | | 11/2004 | Slettedal |

FOREIGN PATENT DOCUMENTS

| | | |
|---|---|---|
| GB | 2 192 607 A | 1/1988 |
| JP | 61-279448 | 12/1986 |
| JP | 03-281188 | 12/1991 |
| JP | 05-069371 | 3/1993 |
| JP | 09 150384 A | 6/1997 |

OTHER PUBLICATIONS

"Machine Intelligence Laboratory," Located at http://www.mil.ufl.edu/projects/gnuman, visited Nov. 8, 2004.

Jacobsen, S.C. et al., "Design of the Utah/M.I.T. Dextrous Hand," Proc. of the IEEE International Conference on Robotics and Automation, 1986, IEEE.

Hirzinger, G. et al., "Torque-Controlled Light Weight Arms and Articulated Hands—Do We Reach Technological Limits Now?," in Sicilano (ed), Experimental Robotics, VII, 1986.

Mirza, K., et al., "Force Distribution for Power Grasp in the Digits System," Symposium Theory and Practice of Robots and Manipulators, 1990.

Rovetta, A., "On Specific Problems of Design of Multipurpose Mechanical Hands in Industrial Robots," Proc. 7th ISIR, Tokyo, 1977.

Skinner, F., "Multiple Prehension Hands for Assembly Robots," Proc. 5th ISIR, Chicago, 1975.

Ulrich, N., "A Medium-Complexity Complaint End Effector," Proc. IEEE International Conference on Robotics and Automation, Philadelphia, 1988, IEEE.

Vassura, G., "Whole-Hand Manipulation: Design of an Articulated Hand Exploiting All its Parts to Increase Dexterity," Robots and Biological Systems, ser. NATO-ASI, New York, 1989, Springer-Verlag.

Mason, M. et al., "Robot Hands and the Mechanics of Manipulation," MIT Press, 1985, Cambridge, MA.

Monta, M, et al., "Harvesting End-effector for Inverted Single Truss Tomato Production Systems", Journal of JSAM, 1998, vol. 60, No. 6, pp. 97-104.

Espinoza, M., "Ohio State Robotic Harvester Sets Eye in Outer Space and Terrestrial Crops", Ohio State University, Aug. 16, 2004, located at http://www.ag/ohio-state.edu/~news/story.php?id=106.

Monta, M. et al., "End Effector for Tomato Harvesting Robot," Artificial Intelligence Review, 1998, vol. 12, pp. 11-25, Kluwer Academic Publishers, Netherlands.

Jongkind et al., "Dextrous Gripping in a Hazardous Environment: Guidelines, Fault Tolerance, and Control," Proc. of the Int'l Conf. on Sys., Man., and Cybernetics, Oct. 1993.

* cited by examiner

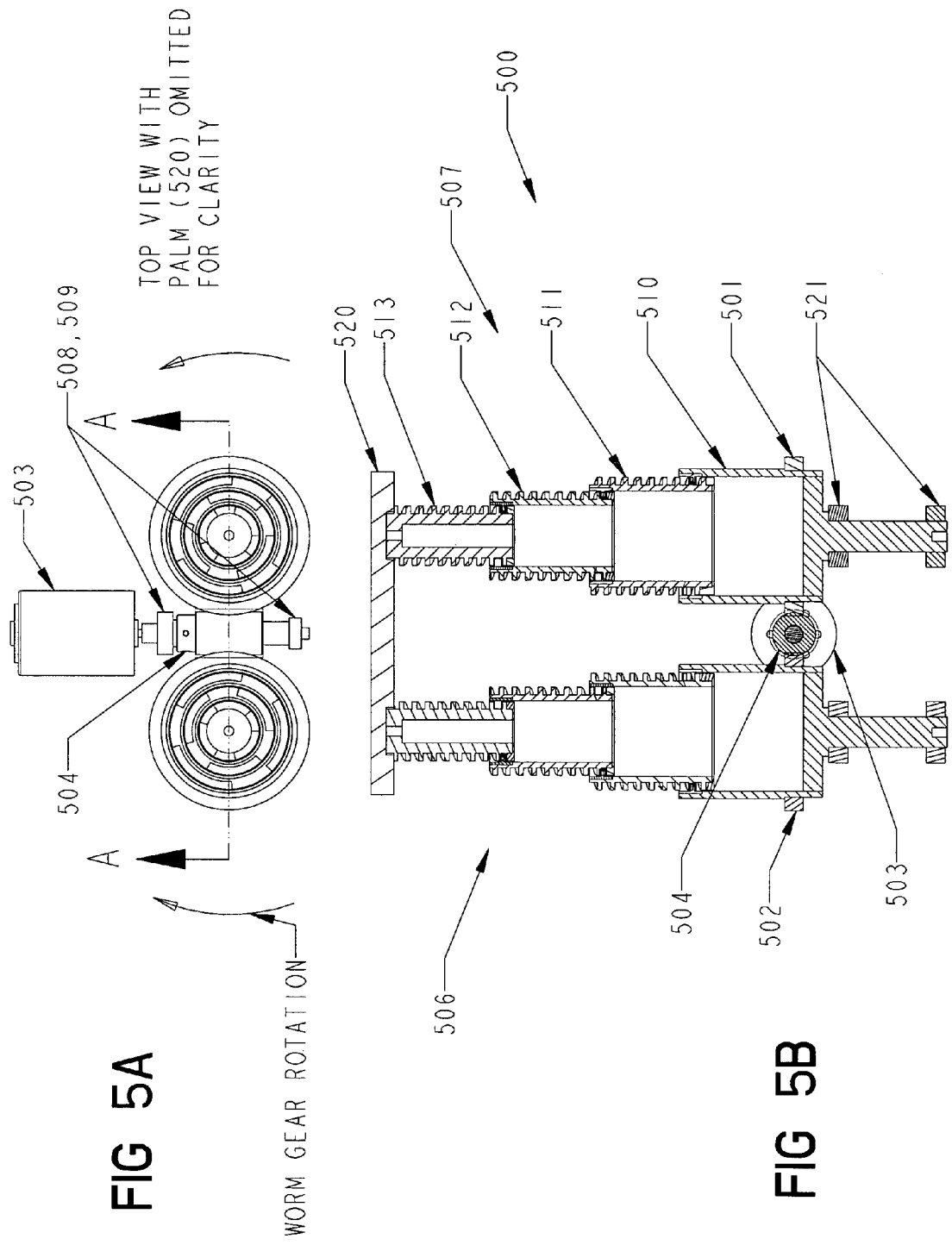

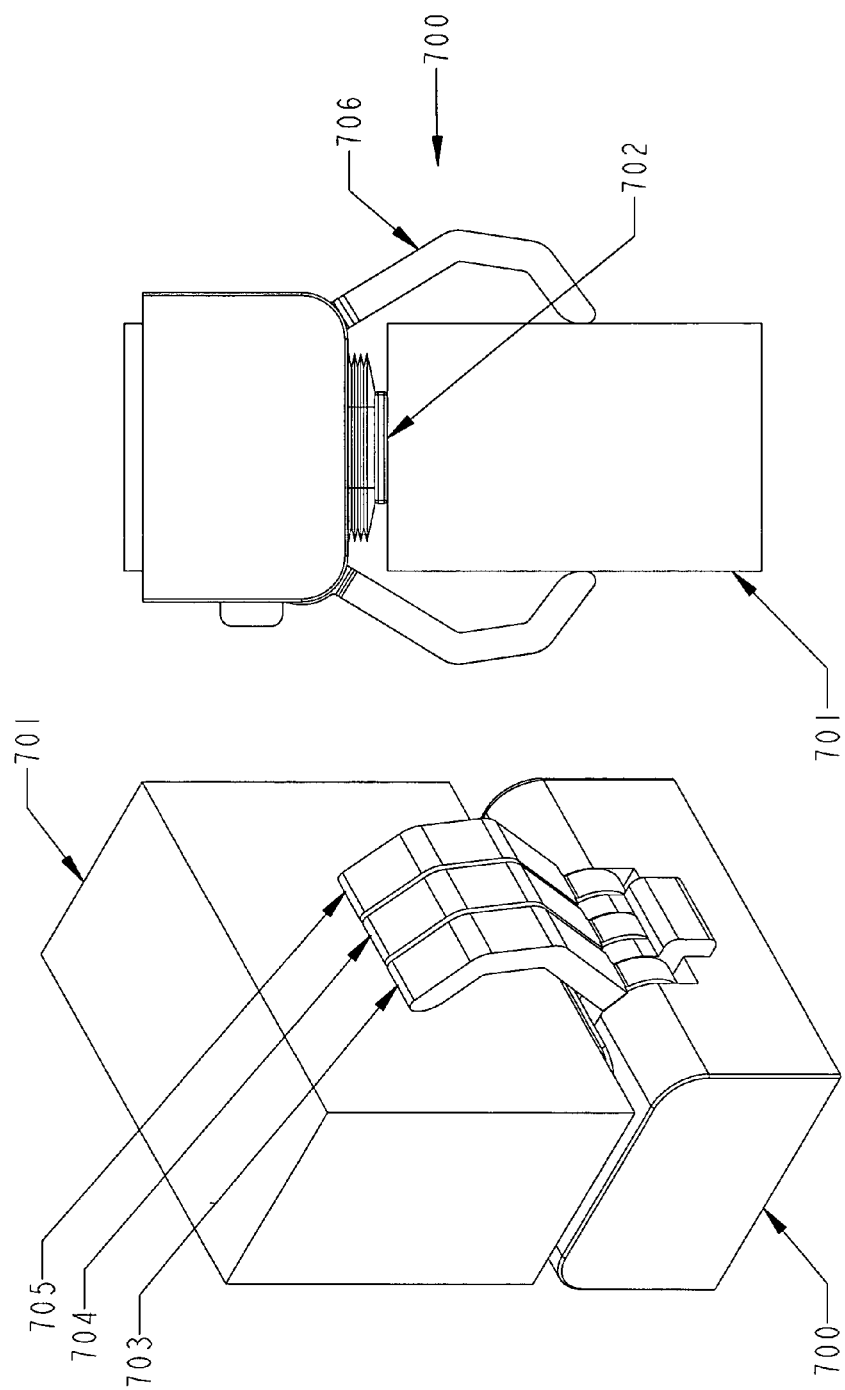

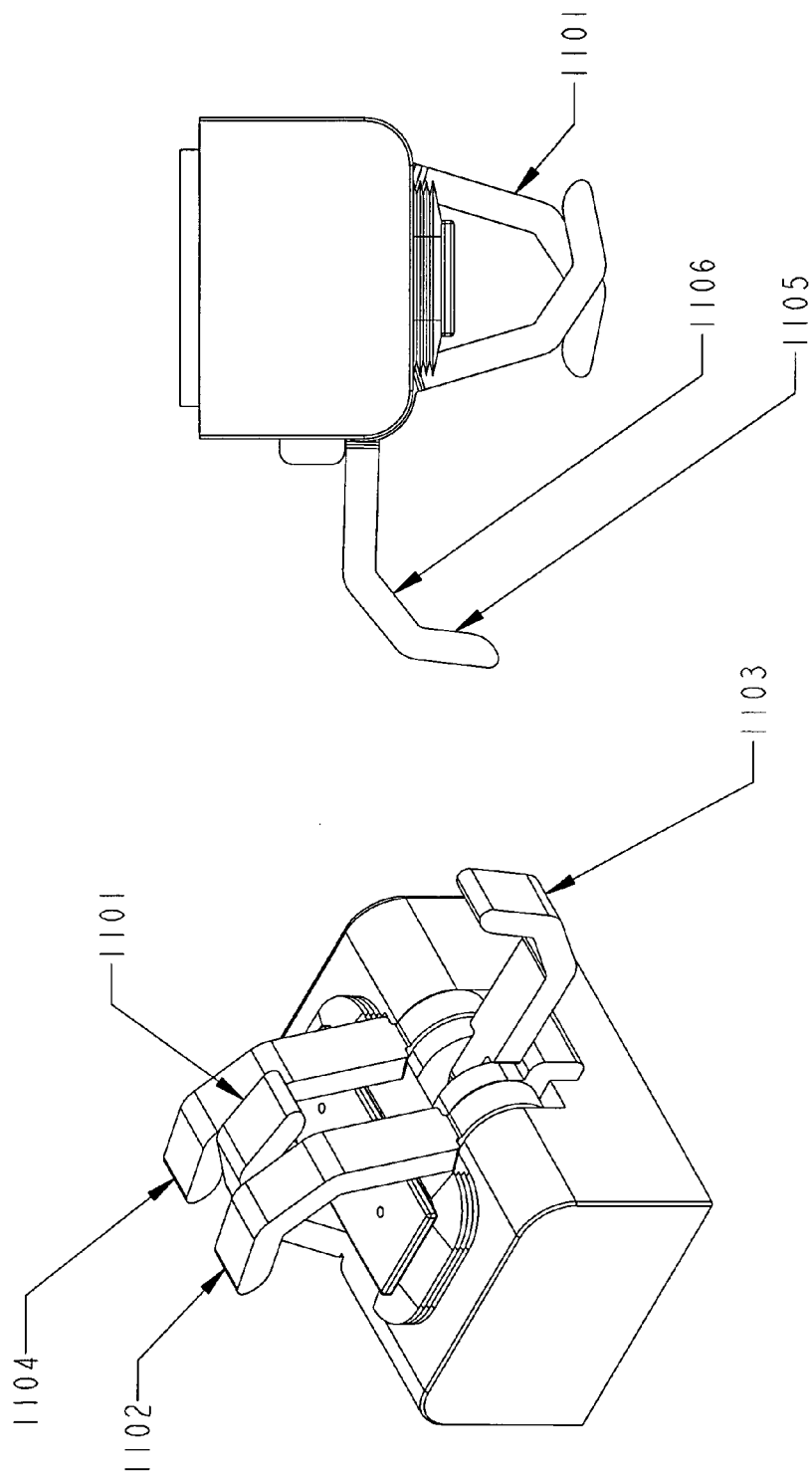

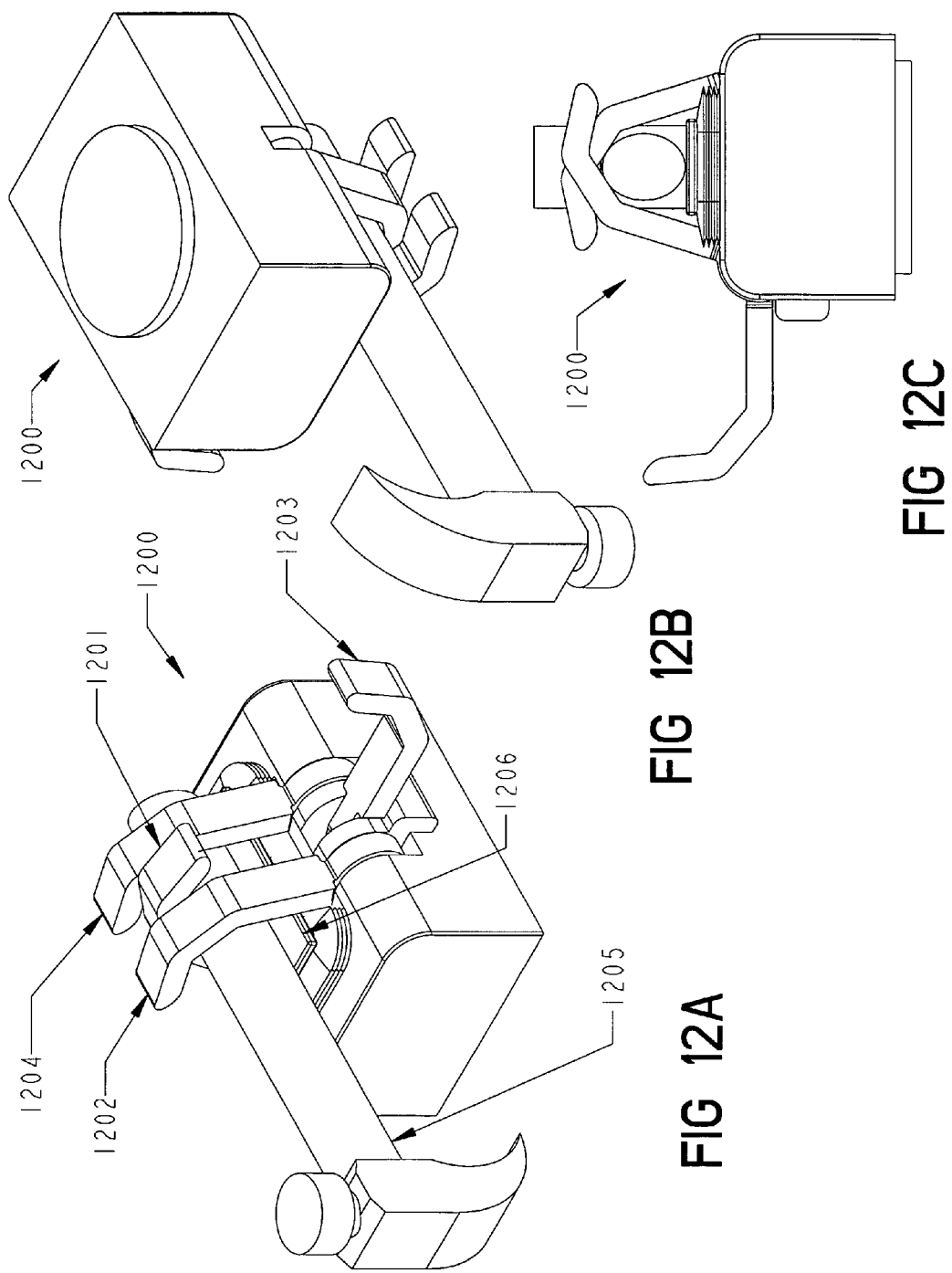

ROBOTIC HAND WITH EXTENDABLE PALM

CROSS-REFERENCE TO RELATED APPLICATIONS

This application claims the benefit of U.S. Provisional Patent Application Ser. No. 60/533,667, filed Dec. 30, 2003, entitled "Robotic Hand with Movable Palm," which is incorporated herein by reference in its entirety.

BACKGROUND OF THE INVENTION

1. Field of the Invention

The present invention relates generally to the field of robotics and more particularly to end-effectors used to grasp objects.

2. Description of the Prior Art

One goal of robotics is to develop robots that can better be used in unstructured environments. Towards this goal, it is necessary to improve robotic grasping so that robots are able to more securely grasp a wider variety of objects that differ in size, shape and weight. An improved end-effector, or hand, for robotic grasping should be simple, robust, and reliable.

Robots used in industrial environments have end-effectors designed specifically for the parts to be grasped. Such special purpose end-effectors are ideal for grasping a single type of part repeatedly and over a long production run. Robots that are able to handle several part types typically employ a turret with multiple end-effectors, or a tool changer is used. These alternatives are feasible so long as the number of different parts involved is small.

In contrast, a robot to be used in an unstructured environment would ideally have an end-effector that can securely grasp a wide variety of objects differing considerably in their size, shape, and weight. Such end-effectors must be able to adapt to the object to be grasped and are generally referred to as robotic "hands."

The many designs for robotic hands can be broadly classified into two groups. The hands of the first group have simple linkages and are limited in their adaptability, while the hands of the second group employ complex linkages to provide greater adaptability. An early design of the first kind is described in a paper by F. Skinner, "Multiple Prehension Hands for Assembly Robots," *Proc. 5th International Symposium on Industrial Robotics*, Chicago, 1975, and in U.S. Pat. Nos. 3,866,966 and 3,901,547. Another early hand of the first kind is described in a paper by A. Rovetta, "On Specific Problems of Design of Multi-Purpose Mechanical Hand Industrial Robots," *Proc 7th ISIR*, Tokyo, 1977. A later design with simple linkages is described in a paper by N. Ulrich, R. Paul, and R. Bajcsy, "A Medium-Complexity Complaint End Effector, *Proc. IEEE International Conference on Robotics and Automation*, Philadelphia, 1988, and in U.S. Pat. Nos. 4,957,320 and 5,501,498. Another design with simple linkages is described in a paper by K. Mirza and D. E. Orin, "Force Distribution for Power Grasps in the Digits System," *Symposium Theory and Practice of Robots and Manipulators*, 1990. U.S. Pat. Nos. 4,792,338 and 5,108,140 provide still further robotic hands with simple linkages.

The hands of the second group have complex linkages to offer greater adaptability. These include a hand described in a paper by K. Salisbury, *Robot Hands and the Mechanics of Manipulation*, MIT Press, 1985, the "Utah/MIT hand" described in a paper by S. Jacobson, "Design of the Utah/MIT Dexterous Hand," *Proc. of the IEEE International Conference on Robotics and Automation*, 1986, a hand described in a paper by G. Vassura and A. Bicchi, "Whole-Hand Manipulation: Design of an Articulated Hand Exploiting All Its Parts to Increase Dexterity," in *Robots and Biological Systems*, ser. NATO-ASI, New York, Springer-Verlag, 1989, and the "DLR" hand described in a paper by G. Hirzinger, "Torque-controlled Light Weight Arms and Articulated Hands," in Siciliano (ed), *Experimental Robotics VIII*, Springer, 2003. U.S. Pat. Nos. 5,172,951, 5,447,403, 5,588,688, 6,244,644, and 6,517,132 and U.S. Patent Application 2003/0090115 also disclose further robotic hands with complex linkages.

Hands with great adaptability employ fingers with multiple active joints per finger. To position a tip of a finger to an arbitrary position in 3-dimensions, at least three degrees of freedom are required. As each active joint can be used to control one degree of freedom, most adaptable robotic hands have three or more fingers, each with three or more active joints. For example, the MIT/Utah hand has a total of 16 active joints. The hand described in U.S. Pat. No. 6,244,644 issued to Lovchik has two fingers and one thumb each with three joints plus three other active joints, for a total of 12 active joints. The DLR hand has four fingers with a total of 13 active joints. The use of a large number of active joints, however, causes hands to be mechanically complex as each active joint can include an actuator, a controller, and means for speed reduction and power transmission. The large number of components combined with stringent space constraints make these designs costly, difficult to manufacture, and expensive to maintain.

Some robotic hands can form grasps by using a palm in addition to the fingers. As explained in more detail below, grasps that utilize a palm are typically more robust than those that only use fingers. Several of the hands described above utilize a palm to form grasps. Skinner, Ulrich, Mirza, Vassura, Hirzinger, U.S. Pat. Nos. 3,866,966, 5,108,140, 5,172,951, 5,501,498, 5,588,688 and 6,517,132, and U.S. Patent Application 2003/0090115 each have a fixed palm. Rovetta has a spring-loaded palm, but one that is not actuated. U.S. Pat. Nos. 4,792,338, and 6,244,644 each have an actuated palm, but one in which the palm is coupled to one or more of the fingers and in which the palm motion is relatively small. In each of these designs the ability of the palm to participate in a wide range of desirable grasps is limited.

Hence, there is a need for a robotic hand having a palm that is moveable over a wide range and can be actuated independently of the fingers.

SUMMARY

The present invention provides robotic hands and methods of grasping objects. An exemplary robotic hand comprises a base, two or more fingers, and a palm. The two or more fingers are attached to the base, and each of the fingers includes an independently actuated joint. The fingers define a working volume relative to the base. The palm includes a broad contact surface and is extendable from the base by an actuator so that the palm can be moved with respect to the working volume. The palm is actuated independently of the two or more fingers.

In some embodiments, the actuator for the palm includes a scissors-type mechanism. In other embodiments, the actuator includes a screw jack. In some of these embodiments, the actuator includes a first screw jack with right-hand threads and a second screw jack with left-hand threads. The threads of the screw jacks can be triple-helix threads, and can have a pitch in the range of 20 to 40 degrees. Some embodiments of the robotic hand employ a composite palm as the palm. In some embodiments, the actuator can be configured to actuate the palm with six degrees of freedom and, in some of these, the actuator is a Stewart mechanism. Also, in some embodiments, the robotic hand further comprises three or more fingers so arranged that the fingers can form an interlaced grasp.

Still another robotic hand of the present invention comprises a base and a common finger support unit including two or more fingers mounted thereon. The base includes a broad contact surface defining a palm. The two or more fingers define a working volume relative to the base. The common finger support unit is configured to translate relative to the base so that translating the common finger support unit will vary a distance from the broad contact surface to the working volume.

The present invention also provides a robot. The robot comprises an arm and an end-effector attached to an end of the arm. The end-effector includes a base, two or more fingers, and a palm. The two or more fingers are attached to the base, and each of the fingers includes an independently actuated joint. The palm includes a broad contact surface and is extendable from the base by an actuator. In these embodiments the palm and the two or more fingers are independently actuated.

The present invention also provides a method for grasping an object with a robotic hand that includes a base, two or more fingers, and a palm. The method comprises actuating the fingers and independently extending the palm from the base such that the two or more fingers and a broad contact surface of the palm contact the object. A particular case of the method comprises forming a caging configuration and forming a caging grasp. Forming the caging configuration is performed by positioning the fingers and palm about the object such that translation of the object is bounded by the fingers. Forming the caging grasp is performed by actuating the fingers and independently extending the palm from the base such that the two or more fingers and a broad contact surface of the palm contact the object. In some embodiments, extending the palm includes either actuating a pair of screw jacks or actuating a scissors-type mechanism. The caging grasp can comprise an interlaced grasp.

BRIEF DESCRIPTION OF DRAWINGS

FIGS. 5A and 5B show top and cross-sectional views, respectively, of the palm actuation mechanism of FIG. 4.

FIGS. 7A and 7B show perspective and side views, respectively, of an embodiment of a robotic hand, having an extendable palm according to the present invention, with the extendable palm retracted to grasp a large box.

FIGS. 11A and 11B show a perspective view of a robotic hand according to an embodiment of the present invention, the robotic hand configured to have interlaced fingers.

FIGS. 12A-12C show two perspective views and an end view, respectively, of the robotic hand of FIG. 11 grasping a hammer using an interlaced grasp.

DETAILED DESCRIPTION

Preferred Embodiments

Figure 1:
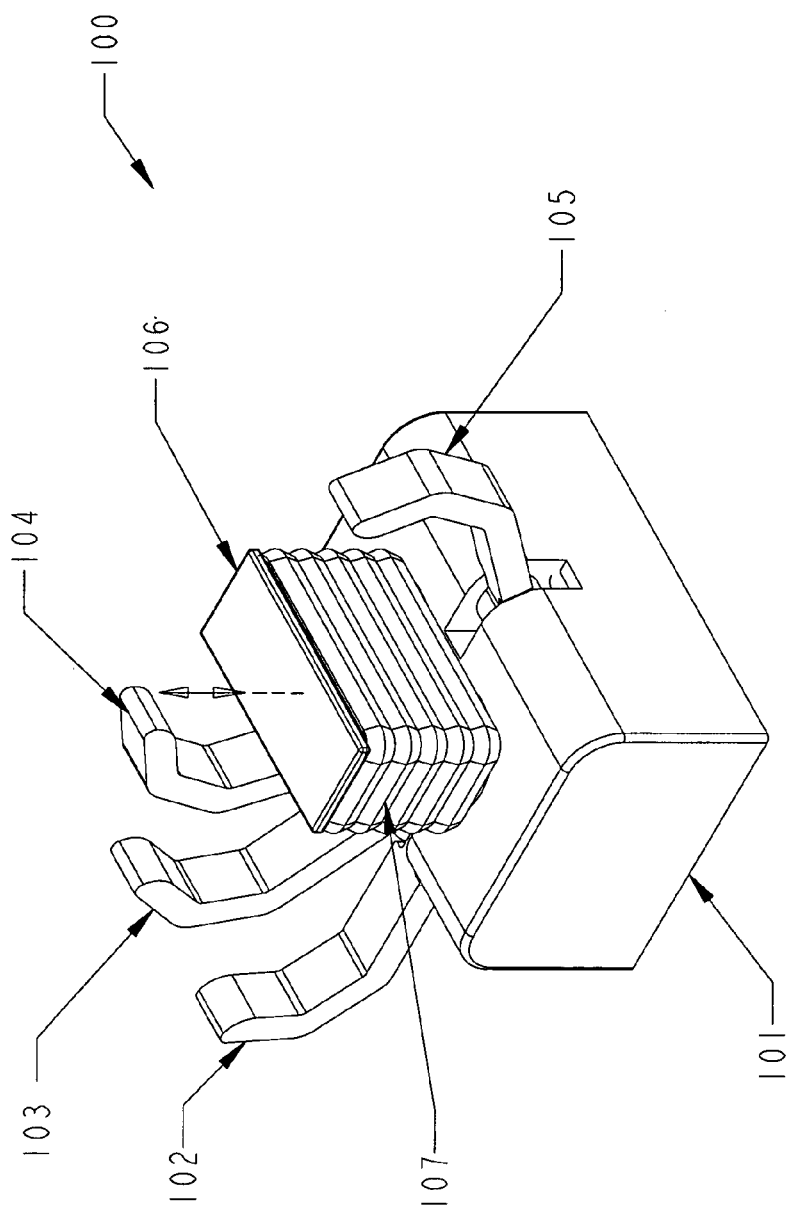
FIG. 1 shows a perspective view of a robotic hand with an extendable palm according to an embodiment of the present invention.

The present invention can best be described by first considering the types of grasps that are performed by the human hand. Broadly speaking, grasps can be divided into two groups, precision grasps and power grasps. A precision grasp is executed between the terminal digit pads of the thumb and fingers. The precision grasp is used when the hand is required to perform delicate handling or manipulation. A power grasp is executed between the surfaces of the fingers/thumb and the palm and is used when a secure grasp is essential.

In many circumstances, the function of the hand is to securely grasp an object; movement or manipulation of the object, once grasped, is performed by an arm. In such circumstances a power grasp is preferred. In other circumstances, when the object is large, only a power grasp provides sufficient force to secure the object against the force of gravity or other externally applied forces. For example, consider grasping a handle of a hammer so that the hammer can be swung to impact a nail. A precision grasp provides insufficient restraining force in this situation and therefore cannot be used successfully to perform this task. In this instance a power grasp is essential.

Similar considerations apply to robotic hands. If a robotic hand is anthropomorphic in design, the fingers and palm are modeled after those of the human hand. Precision and power grasps of such a hand are analogous to those of the human hand. Even when a robotic hand is not anthropomorphic, it must be able to perform the same tasks and consequently must be able to achieve the same functions. We define a "precision grasp" to be one that used only the fingers and a "power grasp" to be one that uses the fingers and palm.

Robotic hands of the present invention can be viewed as having three major components, a base, two or more fingers, and a palm. A finger is constructed as an open kinematic chain of links connected in series by active joints. Each finger terminates at an end including a preferred region for making contact with objects to be grasped. The preferred region is preferably shaped so that a contact area is small. "Contact area," in the present context, means an area of contact between the finger and the grasped object, taking into account any local deformation of the finger and/or of the object. Typically, either a point contact with friction or soft point contact with friction is used when modeling or analyzing the contact made by the fingers.

In contrast, the palm includes a grasping surface intended to provide a large contact area in many grasps. The contact made by the palm is analyzed by considering the boundary of the contact area made between the palm and the object. This contact area can be as large as the grasping surface itself if the object is sufficiently large and suitably shaped.

A precise distinction between the contact provided by a finger and that provided by the palm can be made by considering what occurs when either is in contact with a planar surface. A finger provides essentially a point contact, while the palm provides a planar contact area. If friction is neglected, a point contact permits 5 degrees of freedom of relative motion between the finger and the object, while a planar contact permits only 3 degrees of freedom. This is equivalent to saying that with respect to form closure, a finger provides 1 degree of constraint while a palm provides 3 degrees of constraint. If tangential friction is instead considered, a finger permits 3 degrees of freedom of relative motion between the finger and the planar surface, while the palm permits 0 degrees of freedom.

In many robotic hands, one finger is designed to oppose one of more of the other fingers. Such a special finger is sometimes referred to as a "thumb." So long as the thumb has the contact properties described above, the thumb behaves in a manner equivalent to a finger. Accordingly, the term "finger" will be used herein to also encompass special fingers such as thumbs.

A robotic hand of the present invention executes a precision grasp much like a human hand does, i.e., by using the terminal pads at the ends of the fingers. A power grasp is executed using the surfaces of the fingers and of the palm. Because it provides a broad base of support, the palm provides stability whenever the palm is utilized in a grasp. This makes a power grasp typically significantly more stable than a corresponding precision grasp. Hence, whenever possible, it is desirable to use a power grasp, i.e. to use the palm as one of the contact surfaces when the objective is to securely grasp an object.

Depending on the kinematics of the fingers, there is a volume, the "finger working volume" in which the fingers can be effectively employed to contact an object to be grasped. This volume is fixed in space relative to the base. The robotic hand disclosed herein couples the palm to the base using an actuation mechanism that moves the palm relative to the fingers. This allows the palm to be positioned at varying distances from, or within, the finger working volume so that the palm can participate in a wide range of grasps.

FIG. 1 shows a robotic hand 100 according to an embodiment of the present invention. The hand 100 includes a base 101, fingers 102-105, and an extendable palm 106. An optional bellows, 107, covers and protects an actuation mechanism (not shown) for actuating the palm 106. The palm actuation mechanism causes the palm 106 to move with respect to the base 101 and, hence, with respect to the finger working volume. Typically, the base 101 of the hand 100 is attached to an end of a robotic arm so that the arm can be used to position and orient the hand 100 and the finger working volume. For the purpose of clarity, however, the arm is omitted from this and subsequent drawings.

It is important to note that an extendable palm, as used herein, is distinguishable from the palm of the human hand and from palms of anthropomorphic robotic hands such as prosthetic hands. It is noted that the palm of the human hand, and of certain anthropomorphic robotic hands, is flexible to improve grasping, but that it is not extendable from a base. Embodiments of the invention shown in the accompanying drawings illustrate robotic hands that are generally anthropomorphic in as much as they comprise multiple fingers including an opposable thumb. In these embodiments, the extendibility of the palm has no direct analogue in the human form. It is also important to note that although the embodiments illustrated herein show anthropomorphic robotic hands, the invention disclosed herein is not limited to anthropomorphic robotic hands.

Attention will now be directed to the palm actuation mechanism. In some preferred embodiments a screw jack mechanism is utilized as the palm actuation mechanism. Alternative palm actuation mechanisms are described later.

Figure 2:
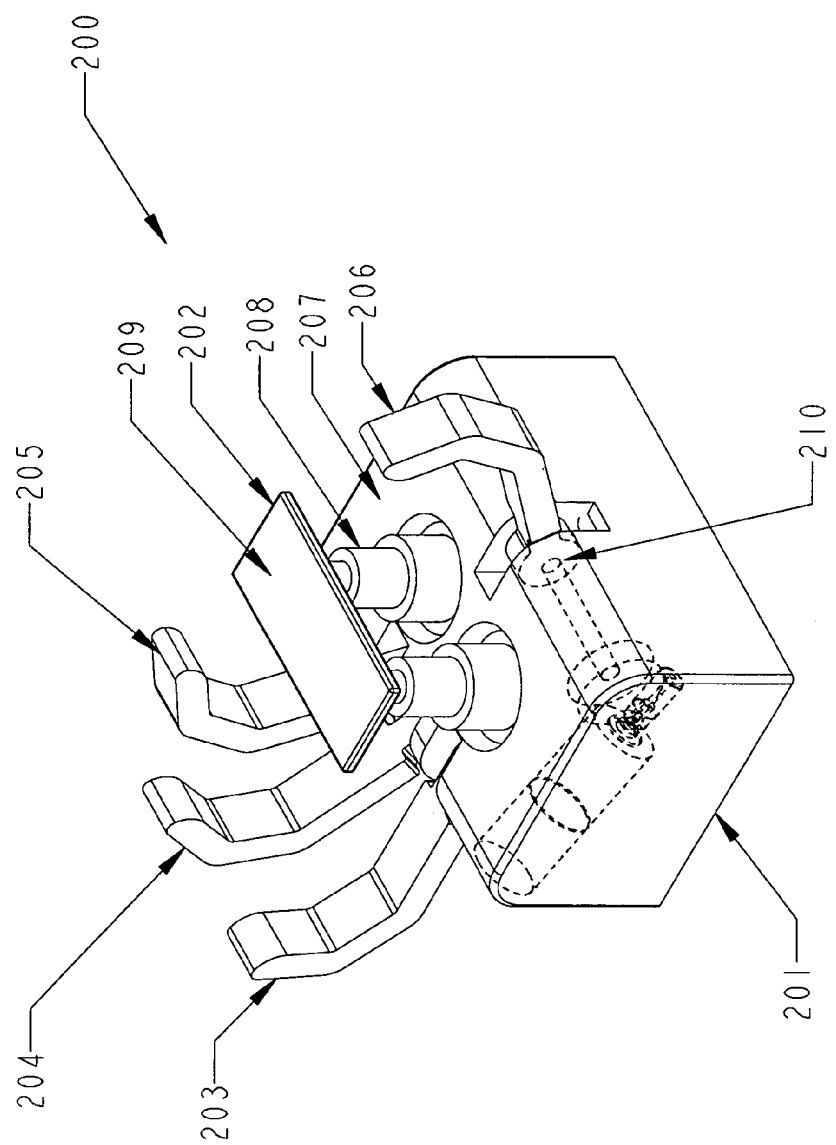
FIG. 2 shows a perspective view of a robotic hand with an extendable palm according to another embodiment of the present invention.

FIG. 2 shows a robotic hand 200 according to a particular embodiment of the invention. Hand 200 includes a base 201, a palm 202, and fingers 203 through 206. Palm 202, in FIG. 2, is coupled to a set of telescoping screw jacks 208, which are described in greater detail in the context of FIGS. 4, 5A, and 5B below. In this embodiment, finger 204 directly opposes finger 206. In some embodiments the palm 202 and tips of some or all of the four fingers 203-206 include a contact switch (not shown) to detect contact with an object.

In the embodiment shown in FIG. 2 the palm 202 is extendable from a top surface 207 of the base 201. It will be appreciated that in some embodiments the palm 202 can be retracted into the base 201 such that the contact surface 209 is recessed beneath the top surface 207. Also, in some embodiments the base 201 lacks the top surface 207, for example, either because the base 201 is not provided with a housing or because the contact surface 209 of the palm 202 serves the same function.

As illustrated in FIG. 2, each finger 203-206 has a single curl joint. The figure shows the curl joint 210 for finger 206; the other curl joints are similar, and have been omitted in the interest of clarity. In the illustrated embodiment the curl joint for each finger 203-206 serves as the attachment point between the finger 203-206 and the base 201. The rotation axes of the curl joints, in the illustrated embodiment, lie generally parallel to the planes defined by the top surface 207 and the contact surface 209, though the axes are not limited to such an arrangement.

Figure 3:
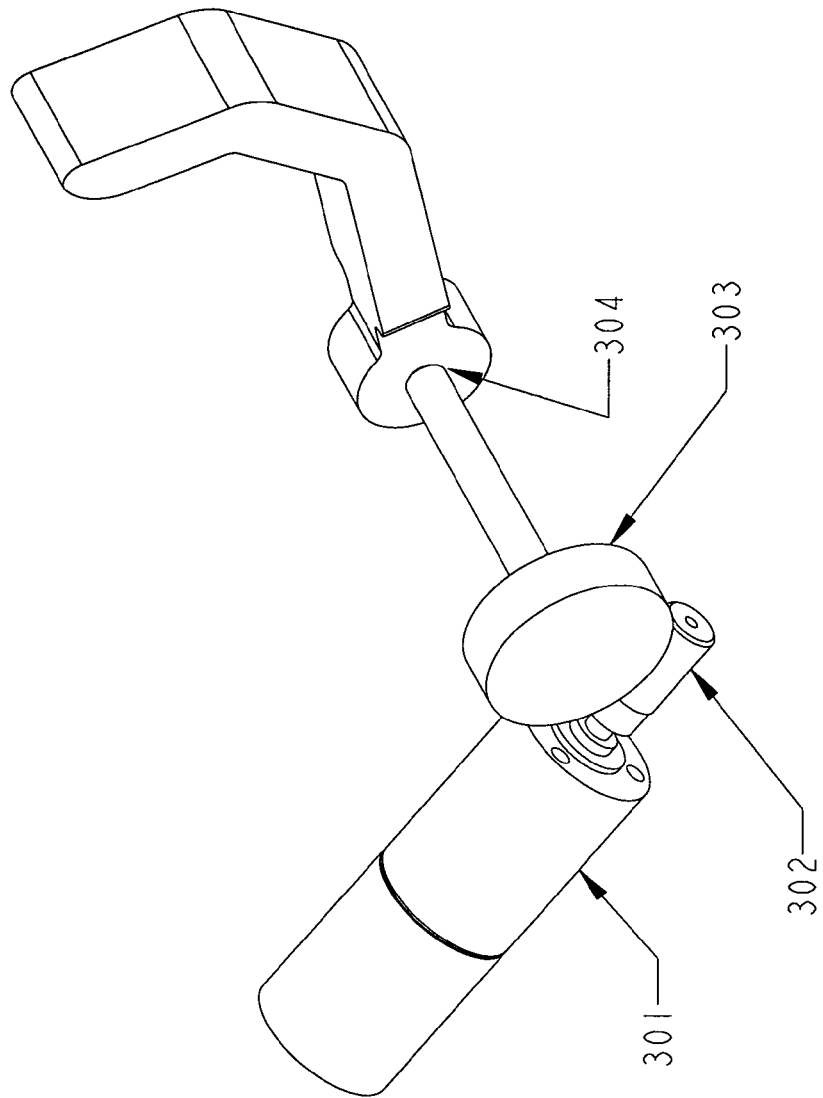
FIG. 3 shows a perspective view of a mechanism for actuating a finger according to an embodiment of the present invention.

FIG. 3 shows a mechanism for operating finger 206 (FIG. 2); the other fingers are similarly actuated. In the embodiment illustrated by FIG. 3 a motor 301 drives a worm 302 that drives a worm gear 303 that drives a curl joint 304. The worm gear 303 is preferably chosen so that the worm/worm gear pair is not back-drivable.

Figure 4:
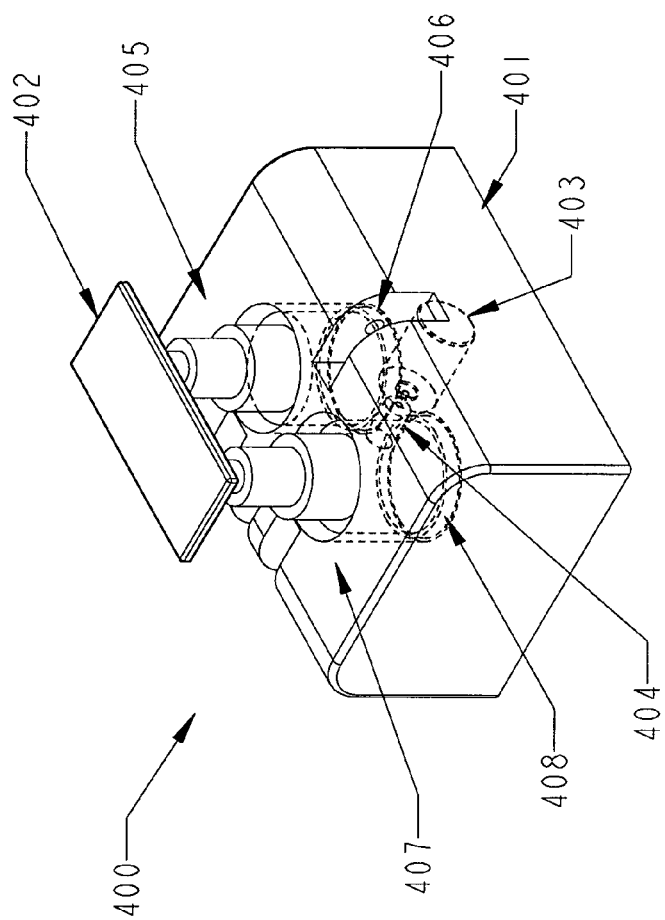
FIG. 4 shows a palm actuation mechanism employing a pair of screw jacks according to an embodiment of the present invention.

FIG. 4 shows an exemplary palm actuation mechanism 400 that employs a pair of telescoping screw jacks 405 and 407 to actuate a palm 402 in a single degree of freedom that is generally perpendicular to the top surface of the base 401. The output of an electric motor 403 drives a worm 404 that, in turn, drives worm gears 406 and 408 that are fixed to a base of each screw jack 405 and 407. As the motor 403 rotates the worm 404, the screw jacks 405 and 407 extend or retract, depending on the direction of rotation of the worm 404, thus moving the palm 402. The worm gears 406 and 408 are preferably chosen so that the palm 402 is not back-drivable.

FIGS. 5A and 5B show a top and a cross-sectional view, respectively, of an exemplary palm actuation mechanism 500. The palm actuation mechanism 500 includes a pair of telescoping screw jacks 506 and 507 driven by worm gears 501 and 502 coupled to a single motor 503 positioned between the screw jacks 506 and 507. This compact and symmetrical arrangement of the worm gears 501 and 502 and motor 503 is advantageous because it allows the drive mechanism to occupy a relatively small volume within the base. An additional advantage of this arrangement is that the radial forces of the two worm gears 501 and 502 acting on the worm 504 tend to cancel one another, resulting in very low radial loads on the motor shaft support bearings 508 and 509. The lower radial bearing loads, in turn, result in reduced friction losses in the support bearings 508 and 509, and also allow for the use of less expensive bearings designed for lighter capacity.

Each screw jack 506, 507 includes four nested stages, a base stage 510 fixedly attached to the respective worm gear 501 or 502, and supported by bearings 521, a first intermediate stage 511 engaged with the base stage 510, a second intermediate stage 512 engaged with the first intermediate stage 511, and a distal stage 513 engaged with the second intermediate stage 512. In some embodiments more or fewer stages are employed. It will be noted that in order for the screw jacks 506 and 507 to operate correctly, the distal stages 513 of the screw jacks 506 and 507 must be prevented from rotating with respect to the base 401 (FIG. 4). This anti-rotation constraint is necessary so that when the base stages 510 are driven by the motor 503 the base stages 510 rotate with respect to the distal stages 513 and cause the palm actuation mechanism 500 to extend or retract. Thus, in addition to the benefits noted above, the use of a pair of screw jacks 506 and 507 is advantageous when compared with using a single jack because the pair allows the distal anti-rotation constraint to be realized by simply coupling the distal stages 513 of the two screw jacks 506 and 507 together with a passive link. As shown in FIG. 5B, this anti-rotation constraint is implemented in some embodiments by using a palm 520 to couple the distal stages 513 of the screw jacks 506 and 507 in a non-rotating relationship.

It can be seen that in order for the screw jacks 506 and 507 to act cooperatively as a single degree-of-freedom actuator, the threads employed in the screw jacks 506 and 507 are of opposite sense (i.e. right-hand and left-hand threading) as shown in FIG. 5B. It can also be observed that in order for rotation of the drive motor 503 to produce predictable and consistent actuation of the palm 520 in one degree of freedom, the helical threads in corresponding stages 510, 511, and 512 of each screw jack 506 and 507 have equal pitches as also shown in FIG. 5B.

Figure 6B:
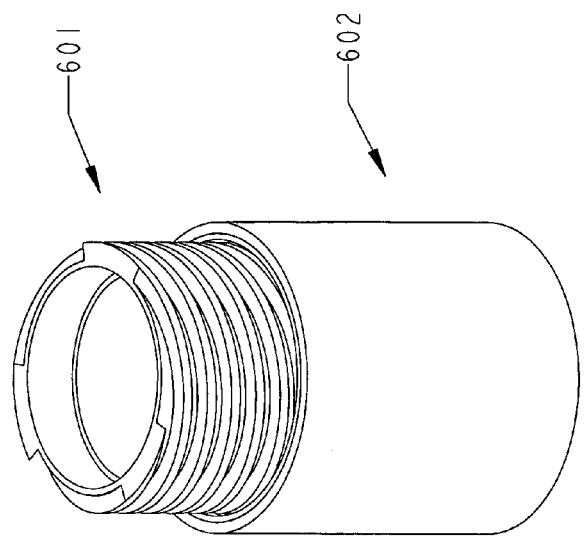
FIGS. 6A and 6B show enlarged perspective views of the male and female threads of two stages of a screw jack where the two stages are disengaged and engaged, respectively.
Figure 6A:
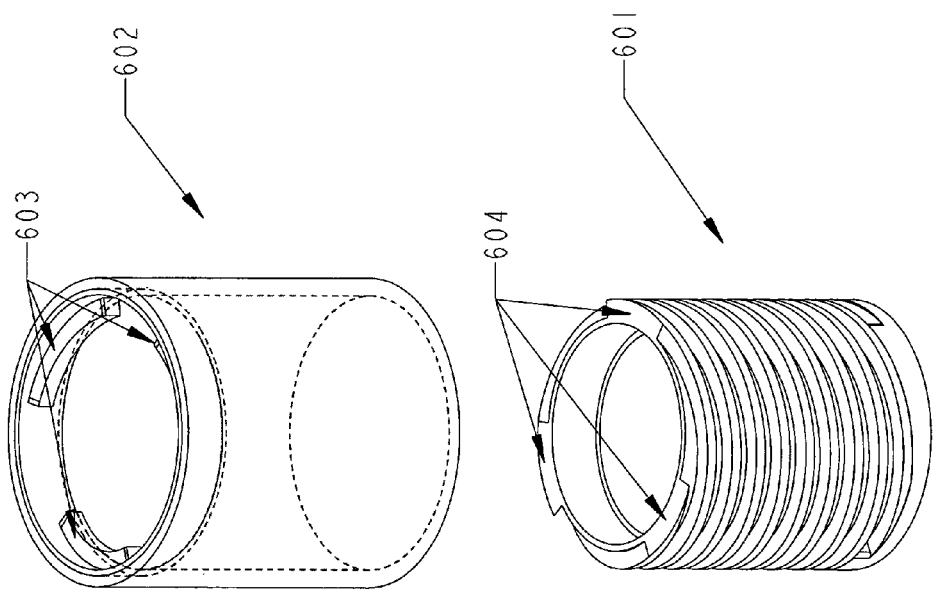

FIGS. 6A and 6B show enlarged perspective views of the male and female threads of the first two stages of the right-hand threaded screw jack 507 (FIG. 5B). FIG. 6A shows a first intermediate stage 601 prior to being threaded into a base stage 602, whereas FIG. 6B shows the first intermediate stage 601 engaged with, and partially extended from, the base stage 602. As shown in FIGS. 6A and 6B, this embodiment includes triple-helix screw threads with a relatively high helix angle (approximately 25 degrees). It can be observed that other thread forms such as conventional single helix threads can alternately be employed.

It will be evident to persons skilled in the art of screw jack design that for robotic hand applications it can be desirable for the palm actuation mechanism 500 (FIG. 5B) to provide both a relatively long length in their extended state and a relatively short length when fully collapsed. It is also well known that high-pitch screw threads (e.g. those with helix angles in the range of 20 to 40 degrees) are often advantageous in screw jack actuators because high-pitch screw threads offer higher mechanical efficiencies and more rapid axial movements than lower-pitch threads. In the present invention, a palm actuation mechanism 500 with these properties allows the base (and therefore the robotic hand as a whole) to be relatively smaller, lighter, and more efficient while providing the required actuation range and actuation rate for the palm 520 (FIG. 5B).

It will also be evident that the screw jacks 506 and 507 (FIG. 5B) must always maintain a minimum length of thread engagement between the mating stages 601 and 602 in order to maintain stability and provide sufficient thread strength to support the load of a grasp (jacking load) without damaging the threads. Typically, at least one full thread (i.e. 360 degrees) of engagement is required for adequate strength and to ensure that stage 601 does not become misaligned or skewed with respect to base stage 602.

In those embodiments that employ a high-pitch but single helical thread, the required minimum length of thread engagement can significantly reduce the maximum extended length of the overall screw jack. For example, in an exemplary embodiment such as that illustrated by FIG. 5B, each threaded stage 511, 512, and 513 is approximately 25 millimeters long, and employs a thread pitch of 10 millimeters. If this palm actuation mechanism instead employed single-helix threads, the required one-thread minimum engagement would reduce the overall extension by about 10 millimeters, or about 40%.

Another advantage of triple-helix threaded stages over single-helix threads is that the triple-helix threads allow for greater pitches (which enables the screw jacks to generate rapid translational movements) while requiring only a relatively small length of thread engagement between the mating stages 601 and 602. This smaller engagement length is possible because the three short segments 603 of the three female threads provide three equally-space supports that have the inherent stability of tripod geometries such as a three-legged stool. At the same time, because the high-pitch threads can be relatively thick along the direction of a screw axis, these three support points 603 can provide adequate strength to support jacking loads without causing thread damage. For example, in an embodiment of the palm actuation mechanism 500 shown in FIG. 5B, the axial thickness (thread engagement length) for each of the three distal stages 511, 512, and 513 is approximately 2 millimeters. Thus, for a 25-millimeter long stage, the 2-millimeter thread engagement of the triple-helix thread reduces the maximum travel by only about 8% (as opposed to about 40% for single-helix threads).

Referring again to FIG. 6A, the three segments 603 of the triple-helix female threads are visible at the top edge of the base stage 602. The three thread starts 604 of the mating male triple-helix thread are visible at the top edge of the second screw jack stage 601. To assemble the second stage 601 into the base stage 602 the second stage 601 is rotated and pushed upward so that the three threads starts 604 engage with the female thread segments 603. The subsequent stages (512 and 513 in FIG. 5B) are mated together in a like manner. During the assembly process, the sense of rotation to engage the threads will be right-handed for all the states of the right-hand jack 507 and left-handed for all states of the left hand jack 506.

FIGS. 7-10 and FIG. 12 show embodiments of a hand of the present invention grasping various objects to illustrate the advantages of the extendable palm. In particular, these drawings show the utility of being able to extend the constraining surface of the palm relative to the working volume of the fingers in order to securely grasp objects.

FIGS. 7A and 7B show perspective and side views, respectively, of a hand 700 grasping a large box 701. A palm 702 is retracted so that the palm 702 contacts the box 701 on one side while the fingers 703-706 contact the box 701 at central positions on sides perpendicular to the one side. With finger contacts in this position, the weight of the box 701 generates little torque about the grasp, irrespective of the orientation of the box 701 when it is moved after grasping. Simultaneously, the palm 702 provides a broad support to resist possible external torques, e.g., should the box 701 collide with another object while being moved.

Figures 8A, 8B:
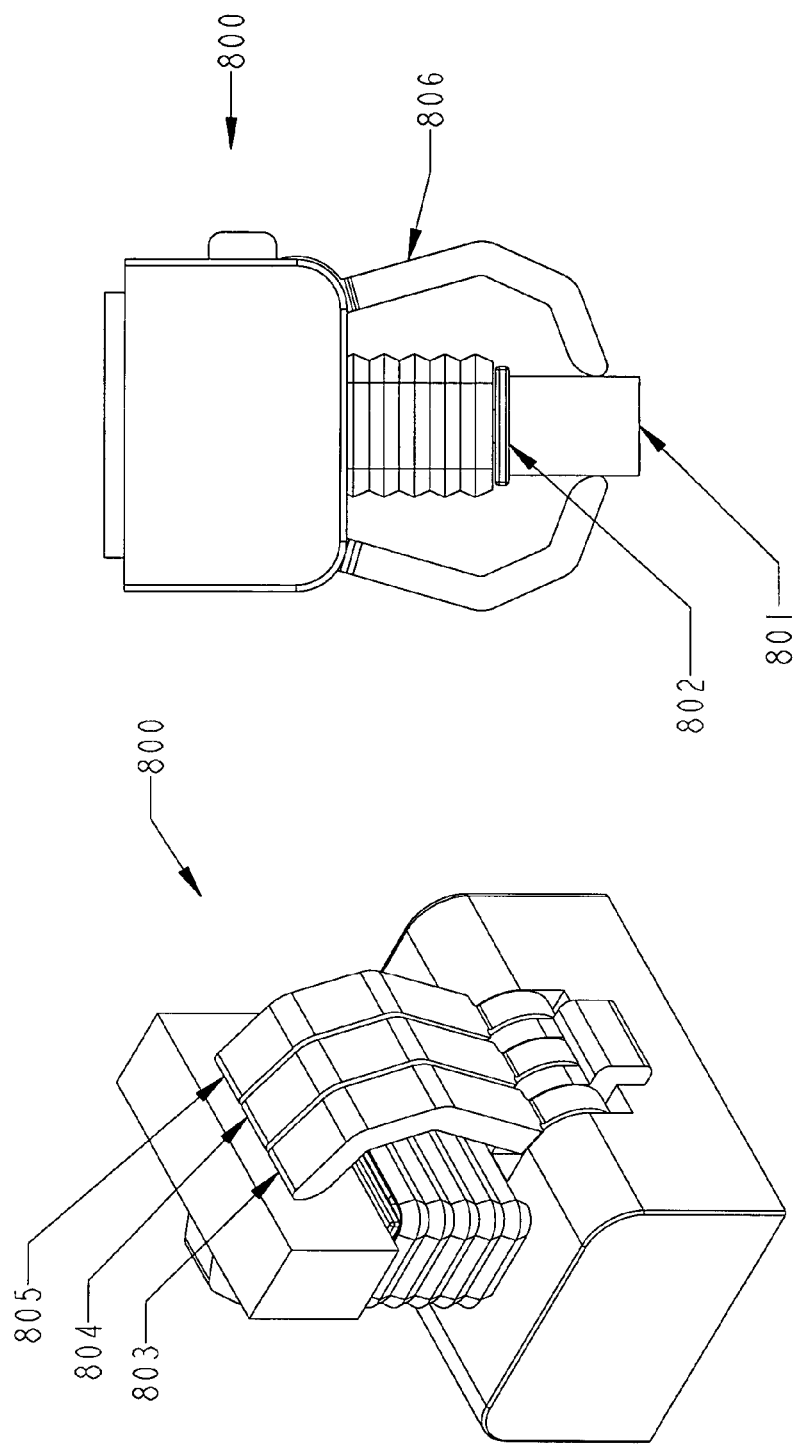
FIGS. 8A and 8B show perspective and side views, respectively, of the robotic hand of FIGS. 7A and 7B with the extendable palm extended to grasp a small box.

FIGS. 8A and 8B show perspective and side views, respectively, of the hand 800 grasping a small box 801. The palm 802 is extended so that the palm 802 contacts the box 801 on a top side while the fingers 803-806 contact the box 801 at medial sides perpendicular to the top side.

Without an extendable palm, the grasp used in either FIG. 7A or 8A might be achieved, but not both. For example, if the fixed distance from a non-extendable palm to the working volume of the fingers is large, the grasp of a large box 701 of FIG. 7A can be attained, but then the non-extendable palm could not participate in a grasp of the small box 801. Conversely, if the fixed distance from the non-extendable palm to the working volume of the fingers is small, the grasp of FIG. 8A can be attained, but then the large box 701 could only be grasped by the fingers close to the one side of the box 701 in contact with the non-extendable palm, which is an inferior grasp to the one shown in FIG. 7A as it is less able to withstand external disturbances. It will be appreciated, therefore, that the ability to actively move a palm relative to a working volume of the fingers allows the palm to be brought into contact with objects of quite different sizes.

It will also be appreciated that the extendable palm allows a robotic hand to achieve a caging configuration and then a caging grasp, that together constitute a particularly robust grasping operation used in many situations. A caging configuration on a supporting surface is defined to be a configuration of a base, palm, and fingers of the robotic hand relative to an object resting on a supporting surface, wherein the object may have some freedom to translate in a plane defined by the supporting surface but where the translation is bounded. Once the hand has been placed in a caging configuration about the object, the fingers and palm can be closed to envelop the object to achieve a secure caging grasp. Even if the object slips as the caging configuration closes to become a caging grasp, the secure grasp will still be obtained. FIGS. 9A, 9B, 10A and 10B illustrate caging grasps.

Figures 9A, 9B:
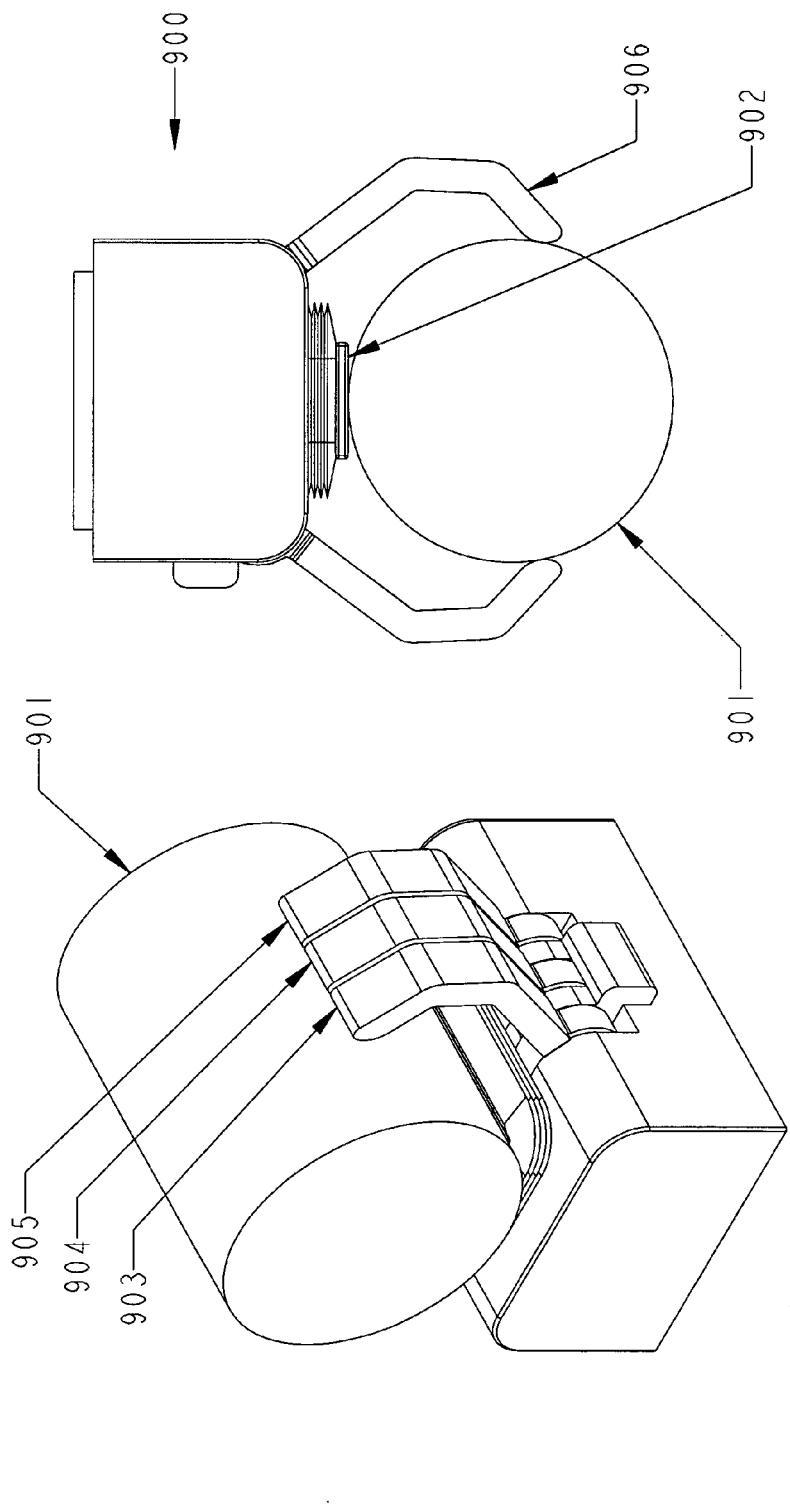
FIGS. 9A and 9B show perspective and side views, respectively, of an embodiment of a robotic hand, having an extendable palm according to the present invention, performing a caging grasp on a cylinder having a large diameter.

FIGS. 9A and 9B show perspective and side views, respectively, of a hand 900 performing a caging grasp on a cylinder 901 having a large diameter. To perform this grasp, the palm 902 is first retracted to nearly its full extent, to allow the fingers 903-906 to extend beyond the widest part of the cylinder 901. Then the fingers 903-906 close about the cylinder 901 to establish a caging configuration without making contact with the cylinder 901. Once the caging configuration has been established, the fingers 903-906 and palm 902 are closed around the cylinder 901 to establish contact and the caging grasp as shown.

Figures 10A, 10B:
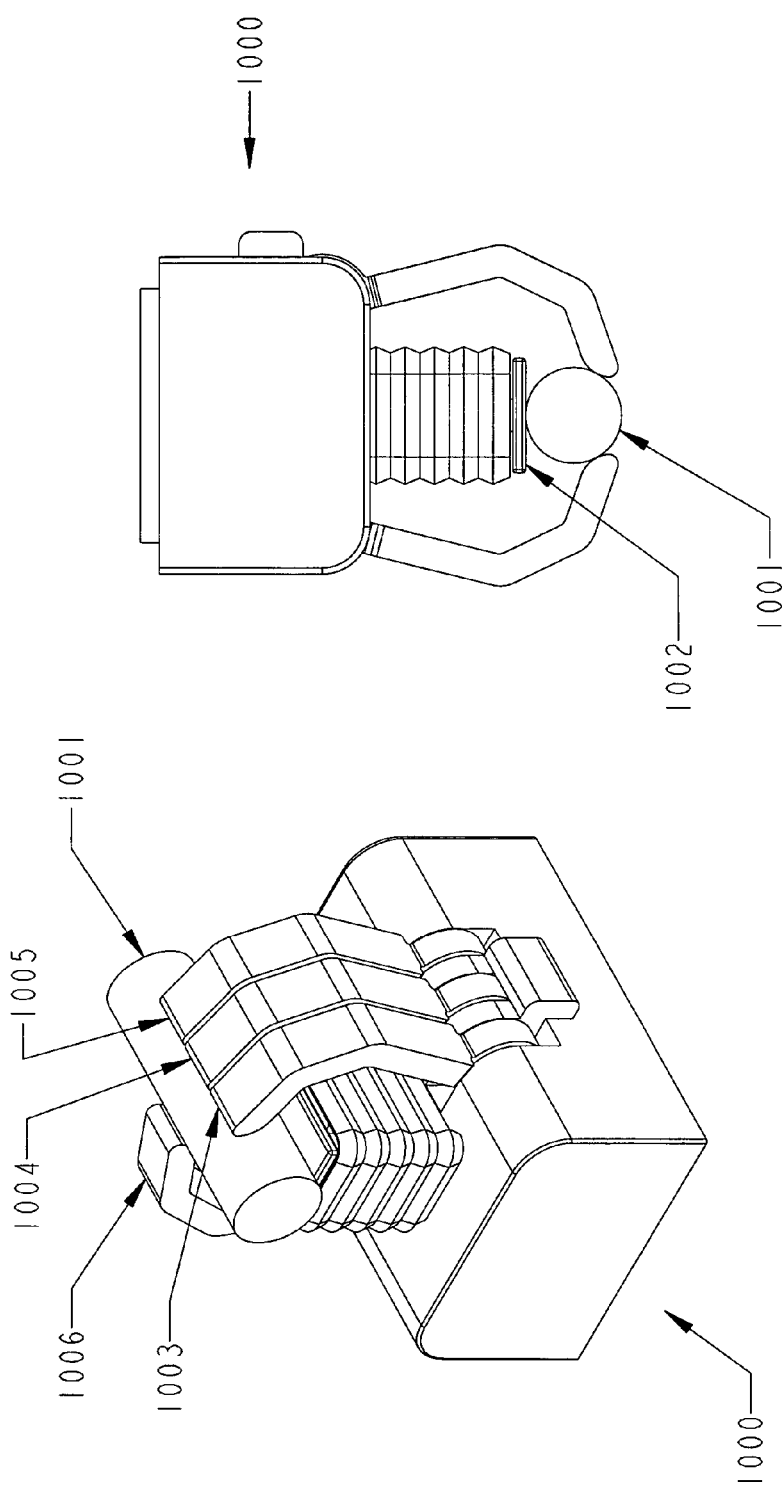
FIGS. 10A and 10B show perspective and side views, respectively, of the robotic hand of FIGS. 9A and 9B grasping a cylinder having a small diameter.

FIGS. 10A and 10B show perspective and side views, respectively, of the hand 1000 grasping a cylinder 1001 having a relatively small diameter. The small diameter requires that a palm 1002 extended to nearly its full extent in order to contact the cylinder 1001 to form a secure caging grasp. It should be noted that in this example, and in other embodiments of the invention, the actuation of the palm 1002 and the fingers 1003-1006 can be performed either sequentially or simultaneously.

With a non-extendable fixed palm, the caging grasp shown in either FIG. 9A or 10A might be achieved, but not both. This illustrates, for a second class of objects, the utility of being able to actively move the palm relative to the working volume of the fingers. Accordingly, the extendable palm of the present invention allows the palm to be brought into contact with objects of quite different sizes while the fingers make contact at locations that produce a caging grasp.

When the shape of the object so allows, another particularly secure grasp can be used, a so-called "interlaced grasp" as shown in FIGS. 11A and 11B. In FIGS. 11A and 11B a finger 1103 that is not included in the grasp is rotated backward. Fingers 1102 and 1104 are sufficiently separated, in this case by a width of finger 1103, that when the curl joints of fingers 1101, 1102, and 1104 are suitably rotated, an end of finger 1101 coming from one side passes between the ends of fingers 1102 and 1104 coming from the other side so that the fingers 1101, 1102, and 1104 interlace.

The end of each finger 1101-1104 has a distal digit surface that is used as the primary finger contact surface in an interlaced grasp. Each finger 1101-1104 has a middle digit surface that is used as a secondary finger contact surface in certain forms of an interlaced grasp. For finger 1103 a distal digit surface 1105 and a middle digit surface 1106 are indicated in FIGS. 11A and 11B. The digit surfaces 1105 and 1106 are so named because they are in approximately the locations of the distal and middle phalanges of the human finger. In the human finger, each is a separate link. In FIG. 11B and other embodiments, the digit surfaces 1105 and 1106 are located on a single link while in still other embodiments the digit surfaces 1105 and 1106 are located on distinct links.

In an interlaced grasp, the fingers are closed so that a portion of the object to be grasped is between the interlaced finger ends and a palm. The distal digit surfaces provide one set of possible contact surfaces. The palm is used to press the object against these distal digit surfaces. If the geometry of the object allows it, the middle digit surfaces are used to press against the object from the sides. An interlaced grasp can be advantageously used in many circumstances. Of these, one particular case may be noted. Many objects have handles shaped for grasping by the human hand and an interlaced grasp is often well suited for grasping handles.

In some situations, it is possible to have a grasp that is both interlaced and caging. For example, a caging configuration is formed and, from the caging configuration, an interlaced grasp is executed. In this case, the robustness of a caging operation is combined with the security of an interlaced grasp.

FIGS. 12A-12C show a hand 1200 grasping a hammer by its handle 1205 using an interlaced grasp. Finger 1203 is not used. The distal middle surfaces of the fingers, 1201, 1202, and 1204, provide one set of contact surfaces. The palm 1206 is almost completely retracted and is used to press the handle against the middle digit surfaces, thereby achieving a secure grasp. Had an object with a small handle been grasped, the interlaced grasp would have used the distal digit surfaces rather than the middle digit surfaces.

Alternative Embodiments and Implementations

The invention has been described with reference to certain preferred embodiments and implementations. Various alternative embodiments and implementations are set forth below. It will be recognized that the following discussion is intended as illustrative rather than limiting.

1. Actuation Mechanisms for the Palm

In embodiments described above, the palm is extended from the base by a pair of screw jacks. In alternative embodiments, the palm is extended by other mechanisms including one or more lead screws, one or more ball screws, a rack and pinion mechanism, a slider crank, a 4-bar linkage or a linkage using more than four bars. In still other implementations, the palm is driven by one or more hydraulic cylinders or one or more pneumatic cylinders. Other embodiments can employ a lift bag or an electro-magnetic solenoid. There are many other equivalent mechanisms that can be used to cause the desired motion of the palm.

Figure 13:
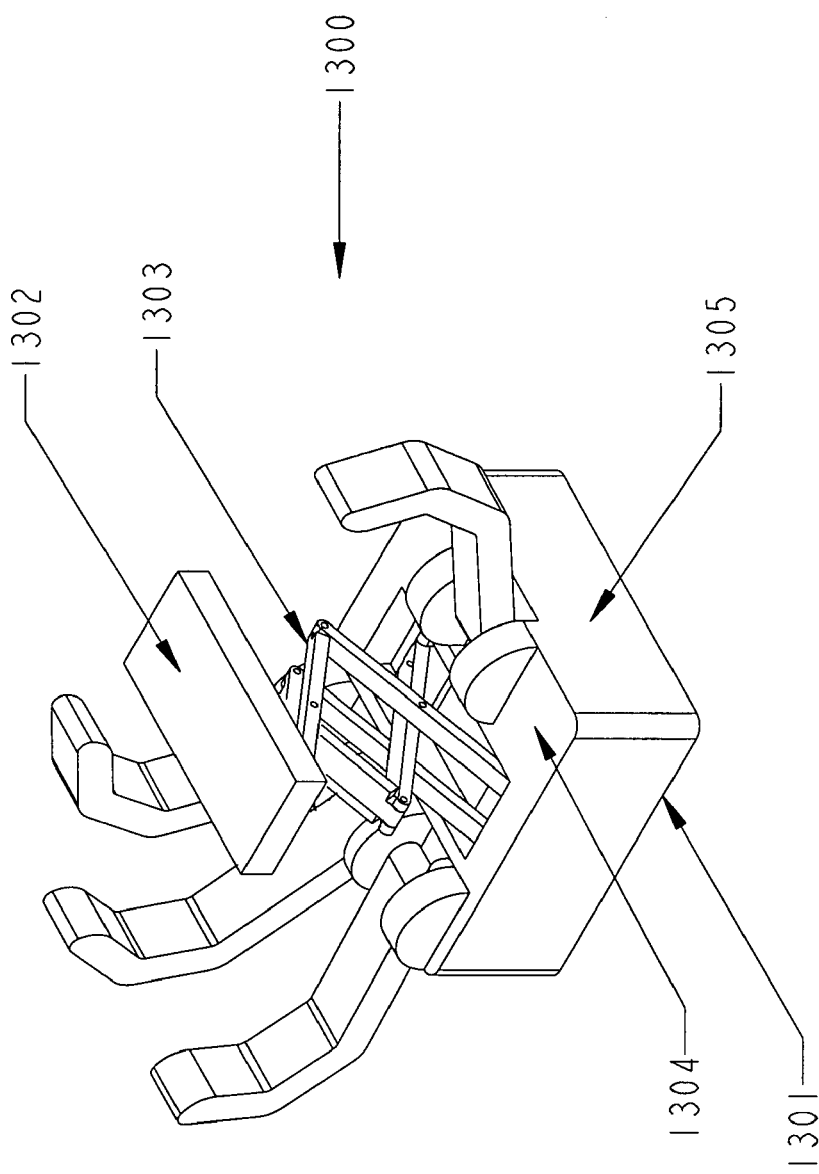
FIG. 13 shows a perspective view of a palm actuation mechanism employing a scissors mechanism according to an embodiment of the present invention.

One example of an alternative actuation mechanism uses a scissors-type mechanism. In FIG. 13 a robotic hand 1300 includes a base 1301 a palm 1302, and a palm actuation mechanism 1303 that employs a scissors mechanism. The base 1301 of the hand 1300 includes a housing having a top surface 1304 and side surface 1305.

Figure 14:
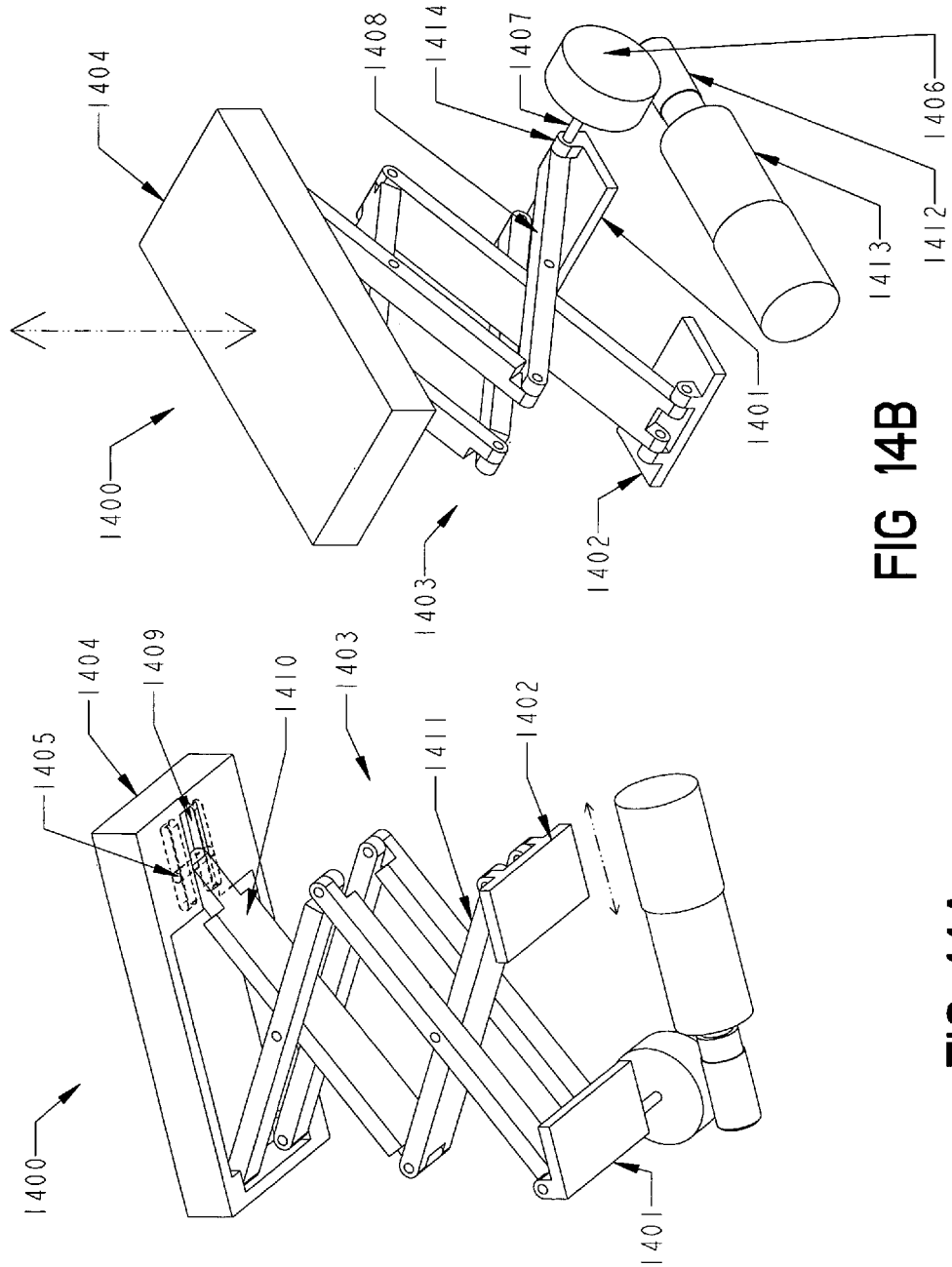
FIGS. 14A and 14B show two perspective views of a palm actuation mechanism based on a scissors mechanism according to an embodiment of the present invention.

FIGS. 14A and 14B show two different perspective views of an exemplary palm actuation mechanism 1400 that is based on a scissors mechanism. The palm actuation mechanism 1400 includes two supports, a fixed support 1401 and a sliding support 1402, that attach a scissor mechanism 1403 to the base 1301 (FIG. 13). Fixed support 1401 is fixedly attached to the top surface 1304 of the base 1301, for example by welding or with fasteners such as screws. Alternatively, fixed support 1401 can be integral with the top surface 1304. Sliding support 1402 is also attached to the top surface 1304, but in a sliding relationship so that the sliding support 1402 is constrained to translate along a linear path that lies in a plane parallel to a plane defined by the top surface 1304 (FIG. 13).

The scissor mechanism 1403 includes a plurality of scissor links such as scissor links 1408, 1410, and 1411. A pin 1405 disposed in a slot 1409 in a bottom surface of a palm 1404 attaches the scissor link 1410 to the palm 1404. It can be seen that the pin 1405 is constrained to move within the slot 1409 in a linear sliding relationship with respect to the palm 1404. The scissor link 1408 is attached to the fixed support 1401 in a rotating relationship by means of a bearing 1414. A drive shaft 1407 is attached to the scissor link 1408 to rotate the scissor link 1408 around the bearing 1414. A motor 1413 is configured to rotate a worm 1412 that turns a worm gear 1406 that drives the drive shaft 1407, as shown. Depending on the direction of rotation of the motor 1413, the palm 1404 is either extended or retracted. As the palm 1404 is actuated, the pin 1405 moves within the slot 1409 and the sliding support 1402 slides relative to the top surface 1304 (FIG. 13).

2. Composite Palm Embodiments

The actuation mechanisms discussed above use a design in which the palm comprises a single broad contact surface (e.g. surface 209 (FIG. 2)). In some alternative embodiments, the extendable palm is a composite palm comprising multiple movable contact surfaces configured to work cooperatively. The contact surfaces of the composite palm are broad surfaces, just as the contact surface of the palms described above. In some of these embodiments, each of the several surfaces is disposed on a separate link, and the several links are coupled together and actuated by a single motor or other drive mechanism.

Figure 15:
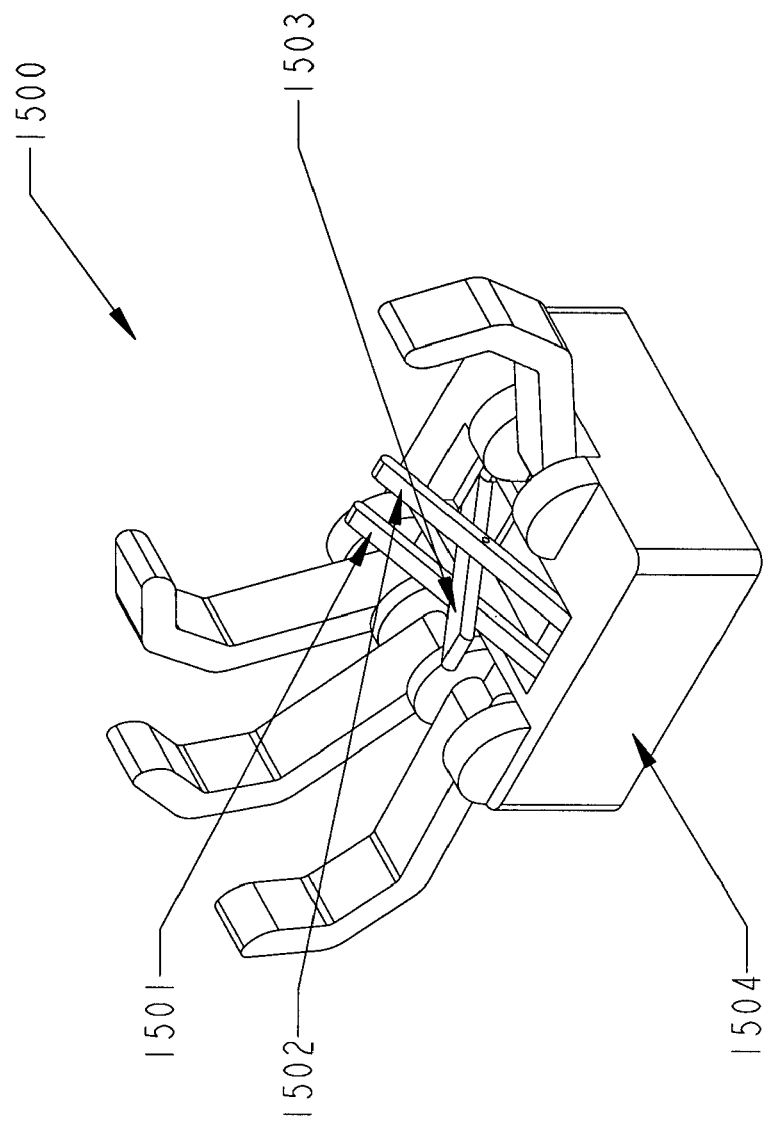
FIG. 15 shows a perspective view of a robotic hand with an extendable composite palm according to an embodiment of the present invention.

FIG. 15 illustrates an alternative embodiment of the robotic hand of the present invention. The robotic hand includes a base 1504 and a composite palm 1500 comprising three surfaces, 1501, 1502, and 1503. In this embodiment, the actuation mechanism of the composite palm 1500 is similar to that of the scissors mechanism described with respect to FIGS. 14A and 14B; the difference is in how the composite palm 1500 contacts an object. It can be seen that actuating the composite palm 1500 causes the three surfaces, 1501, 1502, and 1503 to extend from the base 1504.

Figure 16:
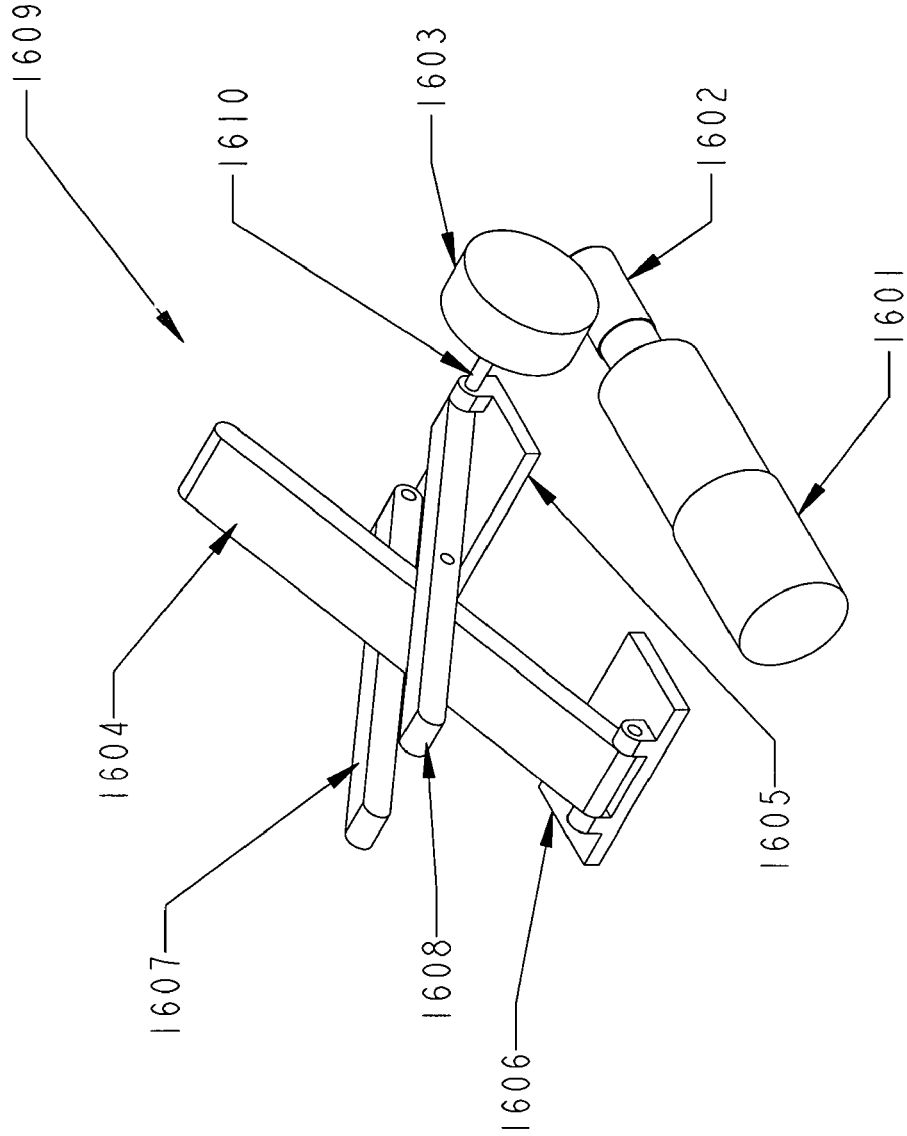
FIG. 16 shows a perspective view of a composite palm actuation mechanism employing a scissors mechanism according to an embodiment of the present invention.

FIG. 16 shows an exemplary composite palm mechanism 1609 including three links 1604, 1607, and 1608, according to an embodiment of the present invention. Links 1604, 1607, and 1608 are pivotally connected to one another at a common pivot axis. The composite palm mechanism 1609 also includes a fixed support 1605 and a sliding support 1606 that attach the composite palm mechanism 1609 to the base 1504 (FIG. 15). Links 1607 and 1608 are pivotally attached to fixed support 1605 which is fixedly attached to base 1504, for example by welding or with fasteners such as screws. Alternatively, fixed support 1605 can be integral with the base 1504. Link 1604 is pivotally attached to sliding support 1606 that is also attached to a top surface of the base 1504, but in a sliding relationship so that the sliding support 1606 is constrained to translate along a linear path that lies in a plane parallel to a plane defined by the top surface.

The composite palm mechanism 1609 also includes a motor 1601 that drives a worm 1602 to rotate a worm gear 1603 connected to a drive shaft 1610. Thus, the motor 1601 is configured to cause links 1607 and 1608 to rotate about an axis of drive shaft 1610. Depending on the direction of rotation of the motor 1601, the composite palm mechanism 1609 is either extended or retracted. As the composite palm 1500 (FIG. 15) is actuated, the composite palm contact surfaces 1501, 1502, and 1503 (FIG. 15) either extend away from, or retract towards, the base 1504. It can also be seen that as the composite palm contact surfaces 1501, 1502, and 1503 are extended the contact surface 1503 is driven towards the contact surfaces 1501 and 1502 in a pinching action.

Figure 17:
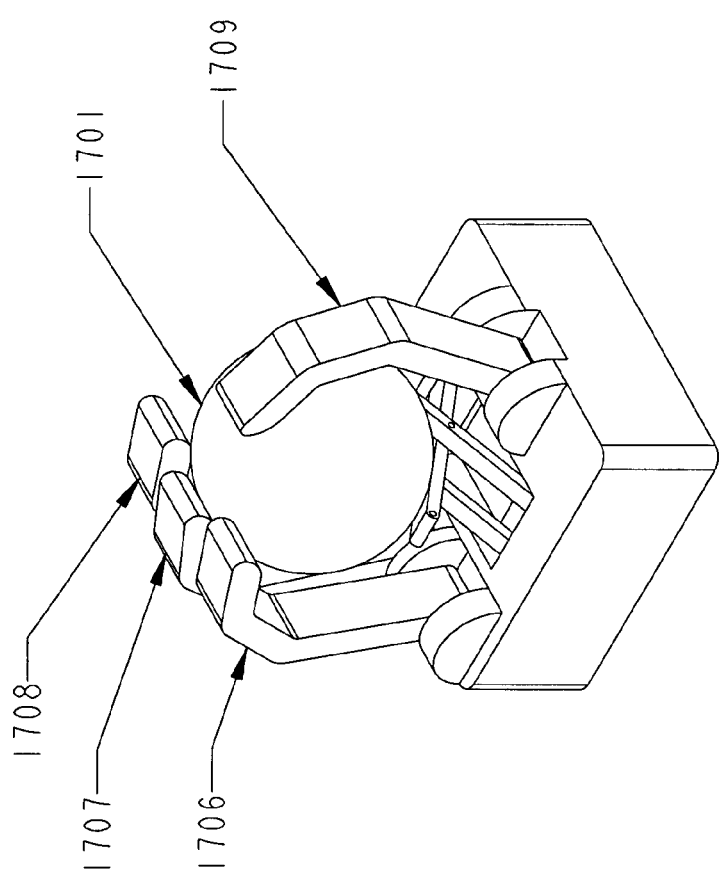
FIG. 17 shows a perspective view of the robotic hand of FIG. 15 grasping a sphere.

FIG. 17 shows a robotic hand with a composite palm grasping a sphere 1701. The composite palm contact surfaces, 1501, 1502, and 1503 (FIG. 15) provide a cradling support beneath the sphere 1701. Fingers 1706-1709 of the robotic hand wrap over the sphere 1701. The embodiment illustrated by FIGS. 15, 16, and 17 is but one particular implementation of a composite palm. Clearly, there are many other ways in which multiple linked surfaces can be actuated to create a composite palm.

3. Degrees of Freedom of the Palm

In the embodiments described above the palm can only be translated along a single axis of motion. In alternative embodiments, the palm actuation mechanism can be configured to allow the palm to be translated along two or more axes, for example orthogonal axes. The palm actuation mechanism can also be configured to allow the orientation of the palm to be adjusted, for example, by rotation, tilting, or both. In various alternative embodiments it is possible to control various numbers of degrees of freedom between the palm and the base. Any number of degrees of freedom from 1 to 6, inclusive, may be so controlled. Alternative embodiments with additional degrees of freedom provide a flexibility that can be utilized to achieve various ends appropriate for various applications.

In one particular alternative embodiment, the palm can be actuated with six independent degrees of freedom, for instance, by a Stewart mechanism. In those further embodiments in which the fingers are each actuated with three degrees of freedom of motion, arbitrary small motions may be imparted to an object being grasped. This alternative embodiment of the present invention allows the object to be grasped with the security of a power grasp, yet manipulated by the hand with the dexterity of a precision grasp.

4. Alternative Mechanisms for Relative Motion

In the embodiments described above, the palm is extendable with respect to the base unit and towards the working volume of the fingers. It will be appreciated that the same effect can also be achieved by moving the working volume of the fingers relative to a fixed palm. Thus, in further alternative embodiments, the palm is fixed with respect to the base of the robotic hand, and the fingers are mounted on a common finger support unit that is translated with respect to the base. In still further embodiments, both the palm is extendable and the fingers are mounted on the common finger support unit.

5. Palm Surface

In the embodiments described above, the contact surface of the palm is essentially flat (or in the case of the composite palm, each of the contact surfaces is essentially flat). In alternative embodiments, the contact surface is shaped. For example, the contact surface can include a "V" shape, an ellipsoidal hollow, or another shape chosen to provide a more congruent contact between objects and the palm. Accordingly, a shaped contact surface can provide a valley in which objects can self-center. It will be appreciated that a shaped contact surface can be chosen to achieve any number of particular objectives. Alternatively, the contact surface of the palm can be equipped with a conformal device such as an inflatable bladder or a bed of spring-loaded rods. Using such a conformal device it is possible to cause the contact surface of the palm to conform to the shape of the object and thereby provide additional support to irregularly shaped objects. It is further possible to construct the palm to include a compliant material, such as rubber or neoprene, so that the contact surface of the palm conforms to the shape of the object. The contact surface of the palm can also be textured for improved gripping.

6. Multiple Actuated Palms

The embodiments described above have a single actuated palm that, in the case of the composite palm, includes multiple moveable contact surfaces. In some alternative embodiments there are more than one extendable palm. In these embodiments the collection of extendable palms can be used to conform more closely to the shape of the object than would be possible with a single actuated palm. Multiple palms can be actuated independently or in a coordinated manner.

7. Backdrivability

In embodiments describe above, the palm and fingers are driven by non-backdrivable gears. This allows the motor to be turned off after a grasp of an object has been established. The object is then held by the force of the contacts under load, effectively acting as a clamp. In alternative embodiments, the drive mechanism is instead backdrivable so that forces from the contacts are transmitted back to the motor. This can be useful to control the applied contact forces in response to external forces exerted on the object.

8. Sensors

In embodiments described above, sensors are provided both for position control of the joints and as contact switches in the tips of the fingers and in the palm. In alternative embodiments, the fingers, palm, and/or other parts of the robotic hand may be equipped with additional and/or alternative sensors. The palm is a convenient location for sensors due to its relatively large size. Hence, the palm can be beneficially equipped with a force/torque sensor, a tactile sensor, and/or a specialized slip sensor used to detect situations in which an object is slipping out of the grasp. In other alternative embodiments, additional contact switches can be placed at other locations on the fingers, and/or the fingers can be equipped with force, tactile, acceleration or other sensors.

9. Fingers

The embodiments discussed above each have four fingers, three on one side of the base and an opposable thumb on the other side. Alternative embodiments employ two, three, four or more fingers. The present invention may be practiced with essentially any numbers of fingers in any arrangement around the base of the robotic hand.

Further, in the preceding embodiments, each finger is constructed of three straight segments that together comprise a single finger link. Each link has a distal digit surface and a middle digit surface located on two of these segments. In alternative embodiments, each finger can be constructed of a different number of segments each of which can be straight or curved. The distal digit and middle digit surfaces can be correspondingly straight or curved. There are many equivalent geometric forms for the fingers and digit surfaces.

Also, in the preceding embodiments, the fingers are each actuated by a revolute joint driving a simple link. In alternative embodiments, the simple link may be replaced by a 4-bar linkage mechanism used so that the fingertips move in a straight-line direction toward each other for a chosen portion of their trajectory. In still other alternative embodiments, other linkage mechanisms may be used to obtain desired trajectories of the fingers. There are many equivalent linkage mechanisms that may be used to move the fingers along various trajectories.

In the previously disclosed embodiments, each of the fingers is equipped with a single curl joint. In alternative embodiments, there may be two or more such curl joints for each finger. Additionally, two or more of these curl joints may be coupled. Further, there may be finger joints in other orientations. For example, a "base joint" may be used to rotate a finger about an axis perpendicular to the plane of the palm. Also, one or more fingers may be equipped with prismatic joints for translating the fingers with respect to each other. The invention may be practiced with various numbers of finger joints, of various types, in various configurations, orientations, and positions.

In the previously disclosed embodiments, all of the fingers are rigid, actuated, open kinematic chains. In alternative embodiments, two or more fingers may comprise a closed kinematic chain attached at two or more points to the base housing. In other alternative embodiments, the fingers may be a closed, non-rigid chain. An example is a finger in the form of a spring, threaded with a cable that can be drawn tight by a motor. There are many kinematic mechanisms that may be used to actuate the fingers.

In the previously disclosed embodiments, all of the fingers have a same shape and have similarly shaped contact surfaces. In alternative embodiments, different fingers may be shaped differently. In addition, the contact surfaces of the various fingers may have different shapes. For example, one or more of the fingers may be particularly thin and have particularly small fingertips for grasping small objects. There are many finger shapes and contact surface configurations that may be employed to optimize the robotic hand for specific tasks.

10. Other Hand Shapes and Structures

The preferred embodiment uses a hand whose shape and structure is described above. In alternative embodiments, the hand comprises different shapes and/or structures. For example, the hand can be anthropomorphic or not anthropomorphic. In hands of various shapes and structures, it is possible to use the invention disclosed herein, employing an extendable palm whose distance from the finger working volume can be controlled. There are many equivalent ways in which an actively movable palm can be employed in hands of various designs to provide a palm contact surface in multiple positions relative to the finger working volume.

11. Other Applications

The present invention disclosed herein has been discussed in the context of robotic applications. It will be recognized that the invention can be used in other applications. Among these other applications is the use of an actively movable palm in a prosthetic hand. Its utility in this role will be clear from the above discussion of grasping and the several illustrations of grasped objects.

In the foregoing specification, the present invention is described with reference to specific embodiments thereof, but those skilled in the art will recognize that the present invention is not limited thereto. Various features and aspects of the above-described present invention may be used individually or jointly. Further, the present invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A robotic hand comprising:
    a base;
    two or more fingers attached to the base, each of the fingers including an independently actuated joint; and
    a palm, including a broad contact surface, extendable from the base by an actuator and actuated independently from the two or more fingers, so arranged that the palm can be moved with respect to a working volume of the fingers and wherein the actuator includes a first screw jack with right-hand threads and a second screw jack with left-hand threads.

2. The robotic hand of claim 1, wherein the threads of the screw jacks are triple-helix threads.

3. The robotic hand of claim 1, wherein the threads of the screw jacks have a pitch in the range of 20 to 40 degrees.

4. The robotic hand of claim 1, wherein the palm is a composite palm.

5. The robotic hand of claim 1, further comprising three or more fingers so arranged that the fingers can form an interlaced grasp.

6. A method for grasping an object with a robotic hand including a base, two or more fingers, and a palm, the method comprising:
    forming a caging configuration by positioning the fingers and palm about the object such that translation of the object is bounded by the fingers; and
    forming a caging grasp from the caging configuration by actuating the fingers and independently extending the palm from the base such that the two or more fingers and a broad contact surface of the palm contact the object and wherein extending the palm includes actuating a pair of screw jacks.

7. The method of claim 6 wherein the caging grasp comprises an interlaced grasp.

* * * * *